June 26, 1951 A. H. FISKE, JR 2,558,550
METHOD AND APPARATUS FOR CALIBRATING SOUND METERS
Filed Aug. 26, 1949
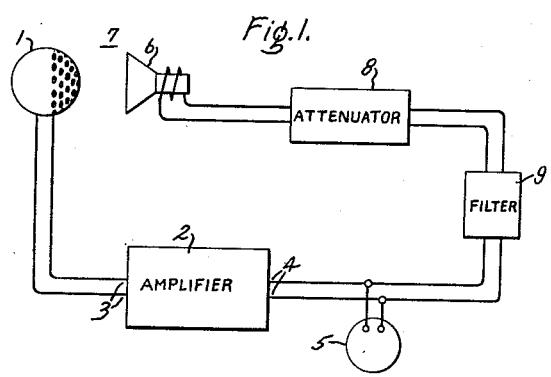
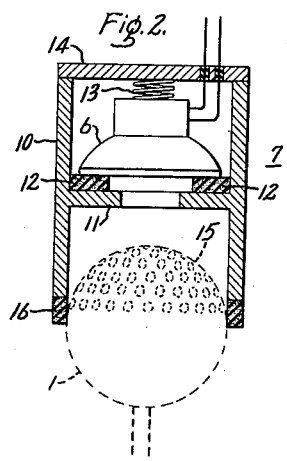
Inventor:
Augustus H. Fiske Jr,
by Paul A. Frank
His Attorney.

Patented June 26, 1951

2,558,550

UNITED STATES PATENT OFFICE 2,558,550

METHOD AND APPARATUS FOR CALIBRATING SOUND METERS

Augustus H. Fiske, Jr., Schenectady, N. Y., assignor to General Electric Company, a corporation of New York Application August 26, 1949, Serial No. 112,616

2 Claims. (Cl. 179—175.1)

My invention relates to sound level meters and more particularly to a method and apparatus for calibrating such meters.

The use of noise or sound level meters such as the type employing an electronic amplifier having a microphone input and an output instrument to indicate the intensity of the sound received by the microphone is well known. The need of frequent recalibration of such apparatus, because of variations in the characteristics of the microphone and amplifier due to aging and the various conditions of use, is also well known. While the amplifier itself may be calibrated very simply by adjusting its gain to produce the correct output indication for a given test input voltage, calibration of the entire sound level meter system requires the use of a standard noise source with which the output reading of the meter is compared. Calibration by this method, however, requires a combination of skill and calibration apparatus which is often not readily available to the user of the sound level meter.

It is an object of my invention to provide an improved method of calibrating a sound level meter.

It is a further object of my invention to provide a feedback apparatus for calibrating a sound level meter.

A feature of my invention is the use of calibrating apparatus for feeding the sound level meter amplifier output back into the microphone input through a stable feedback circuit presenting a known loss. In calibrating a sound level meter with such a feedback system, the gain of the meter amplifier is adjusted to the threshold of oscillation. Under these conditions, the gain of the sound level meter is exactly equal to the losses in the feedback network level, the output indication at that point being compared with the known loss in the calibrated feedback circuit. The system may also be adjusted so that it may be calibrated at a certain predetermined feedback level other than the threshold of oscillation; thus, the gain of the sound level meter and the losses in the feedback calibration circuit are adjusted so that oscillations occur at a certain specified amplitude which can be read on the meter.

The features which I desire to protect herein are pointed out with particularity in the appended claims. The invention itself, together with further objects and advantages thereof, may best be understood by reference to the following description taken in connection with the drawings in which Fig. 1 schematically represents a sound level meter together with calibration apparatus employed according to my invention, and Fig. 2 is a cross-section view of part of the calibrating apparatus.

Referring now to Fig. 1, a known type of sound level meter is schematically represented in which an acousto-electric transducer 1 is connected to an amplifier 2 at its input terminals 3. An indicating instrument 5, which may be suitably calibrated in decibels, is connected to the output terminals 4 of the amplifier. The input transducer 1 of sound level measuring systems of this nature is preferably a microphone of the crystal type, since it offers a relatively high sensitivity and output, although it is not as stable in its operating characteristics as some of the other types. The amplifier 2 preferably employs electron discharge devices in a suitable amplifier circuit having an adjustable gain control, and its components may vary with age and use to affect its gain.

In operation of such sound level measuring apparatus, the sound to be measured is converted to an electrical signal by the transducer 1 and suitably amplified by the amplifier 2 to produce an indication on the output instrument 5 which serves as a measure of the sound level at the input transducer. The sound level system is originally calibrated against a standard noise source, but due to variations in the characteristics of its components, such as may be caused by aging, handling, and variations in temperature and humidity, recalibration is usually frequently required.

According to my invention, I employ a feedback calibration circuit which is also schematically shown in Fig. 1, and which may be conveniently employed to recalibrate a sound level meter after it has left the factory or laboratory where it was originally calibrated. A stable electro-acoustic transducer 6, such as an electromagnetic type of loud speaker, is connected to the amplifier output 5 and acoustically coupled by a coupling means, described in a following paragraph, to the input transducer 2 to feed back the sound meter output. The feedback circuit has inherent losses consisting of the resistance losses of the transducer electrical circuit and the acoustical losses between the feedback and input circuit transducers, and the loss may be adjusted to a desired total by adding an adjustable attenuator 8, which may suitably consist of an adjustable resistor in series with the leads of the feedback transducer 6. Also shown schematically in the feedback circuit of Fig. 1 is a single frequency pass filter 9, which may be employed if it is desired to conduct the calibration at a single predetermined frequency.

In calibrating the sound level meter, the feedback energy from the amplifier output is employed to energize the input transducer, and the gain of the amplifier is adjusted until the amplifier is at the oscillation threshold. The amplifier gain at this adjustment, as indicated on the output indicator 5, is a measure of the loss in the calibration feedback circuit. Since the calibration circuit comprises relatively stable components and thus presents the same loss over a period of time, it may be originally calibrated by the noise level meter itself after the meter has been freshly calibrated against a standard source of noise under favorable conditions, such as in a laboratory or factory where the meter is assembled and adjusted. The calibration circuit may be employed for a substantial period of time thereafter to represent a known decibel loss for which the scale reading on the output indicator 5 is accordingly recalibrated after the amplifier gain has been adjusted to the oscillation threshold. In an alternative method of calibrating the sound level meter energy at any predetermined feedback level is employed. The gain of the meter and the losses in the feedback calibration circuit are adjusted so that oscillations occur at a certain specified amplitude, as indicated by the instrument 5. The specified output amplitude is determined when the sound level meter has been freshly calibrated, as in the method previously described.

In Fig. 2, the coupling means or holder for the calibration transducer which provides acoustical coupling with the input transducer 1 of the sound meter is indicated by the numeral 7. This holder provides a fixed spaced relationship between the output or feedback transducer 6 and the input transducer 1, thus maintaining a fixed acoustical loss between those elements. The holder, at the same time, provides acoustical shielding from other sound sources. As shown in the drawing, the holder 7 may suitably comprise a generally cylindrical metallic housing 10 having an internal transverse wall 11 suitably apertured to permit transmission of sound from one end of the housing to the other. The feedback transducer 6 is positioned on one side of the wall 11, being preferably spaced therefrom by resilient rubber pads or other acoustic insulators 12 and resiliently held in position by such means as a compression spring 13 located between an end plate 14 of the housing and the feedback transducer 6. As can be seen from the figure, the open end of the housing is dimensioned to receive the input portion of the casing 15 of the input transducer 1, which is shown in dotted outline. A suitable acoustical insulation, such as an annular ring of foam rubber 16, is mounted on the open end of the housing to make a snug fit with the transducer casing 15 when the transducer 1 is inserted therein for calibration.

If it is desired to calibrate the sound level meter at a particular frequency, a filter 9, previously mentioned, may be employed. A single frequency pass filter of conventional design may be suitably employed and is connected in series between the amplifier output 4 and the feedback transducer 6 in order to pass the desired resonant frequency energy and attenuate the other output frequencies.

While I have mentioned an electrical filter 9 as employed between the amplifier and the feedback transducer, it is obvious that without departing from the spirit of my invention, an acoustical filter may be employed instead in the acoustic coupling 7 between the feedback and input transducers. Without describing here the details of acoustic filters, the dimensions of the acoustic coupling means 7 may be arranged to provide the desired filtering effect, the air spaces between the vibrating surfaces of the feedback transducer 6 and the inner surface of the holder 7 being analogous to electrical capacitance and the aperture in the annular supporting ring 11 being analogous to inductance. Similarly, the attenuator 8 need not be in the electrical circuit, but may be built into the said acoustical coupling, such as by placing a wad of glass wool or other acoustic insulator in the space between the feedback and input transducers.

While the present invention has been described by reference to particular embodiments thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. The method of calibrating a sound level meter of the type having an input acousto-electric transducer, an amplifier having an adjustable gain, and an output indicator, which comprises feeding back the output energy of said amplifier to said input transducer through an electro-acoustic transducer, and adjusting the gain of said amplifier to the oscillation threshold to provide an output reading of said output indicator bearing a relation to the energy losses associated with said feedback means.

2. Apparatus for calibrating a sound level measuring system of the type having an input acousto-electric transducer and an amplifier having an adjustable gain, which comprises a feedback circuit having a stable electro-acoustic transducer adapted to be connected to the output of said amplifier through an adjustable attenuating means, means for holding said electro-acoustic transducer in a definite spaced relationship with said acousto-electric transducer to provide a stable acoustic coupling therebetween, and said means being acoustically insulated to isolate said acousto-electric transducer from other sources of sound, and a single frequency filter in said feedback circuit to limit the feedback energy to a single calibrated frequency.

AUGUSTUS H. FISKE, Jr.

REFERENCES CITED

The following references are of record in the file of this patent:

UNITED STATES PATENTS

| Number | Name | Date |
|---|---|---|
| 1,603,273 | Frederick | Oct. 19, 1926 |
| 2,394,613 | Houlgate et al. | Feb. 12, 1946 |